(12) United States Patent
Kusano et al.

(10) Patent No.: US 11,041,824 B2
(45) Date of Patent: Jun. 22, 2021

(54) MEASUREMENT DEVICE AND MEASUREMENT METHOD

(71) Applicant: LAPIS SEMICONDUCTOR CO., LTD., Kanagawa (JP)

(72) Inventors: Kenichiro Kusano, Miyagi (JP); Atsuhiko Okada, Kanagawa (JP); Hiroaki Sano, Kanagawa (JP); Masao Okihara, Kanagawa (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 20 days.

(21) Appl. No.: 16/421,193

(22) Filed: May 23, 2019

(65) Prior Publication Data
US 2019/0360962 A1    Nov. 28, 2019

(30) Foreign Application Priority Data

May 24, 2018  (JP) .............................. JP2018-099729

(51) Int. Cl.
*G01N 27/414*    (2006.01)
(52) U.S. Cl.
CPC .................................. *G01N 27/414* (2013.01)
(58) Field of Classification Search
CPC ........... G01N 27/4175; G01N 27/4163; G01N 27/3274; G01N 27/414–27/417; G01N 27/4166; G01N 27/4167; G01N 27/301; G01N 27/302; G01N 27/333; G01N 27/3335; G01N 27/416; G01N 21/274; G01N 2201/127; H01L 29/2924; H01L 29/13073; C12M 41/26
See application file for complete search history.

(56) References Cited

U.S. PATENT DOCUMENTS 4,701,253 A *  10/1987  Ligtenberg ......... G01N 27/4148
                                                   204/402
2012/0187000 A1*  7/2012  Kahn ................. G01N 27/3335
                                                   205/782

FOREIGN PATENT DOCUMENTS

JP    2017-110978 A    6/2017

OTHER PUBLICATIONS

David Welch et al., "Experimental and Simulated Cycling of ISFET Electric Fields for Drift Reset", IEEE Electron Device Letters, vol. 34, No. 3, Mar. 2013, pp. 456-458.

* cited by examiner

*Primary Examiner* — Gurpreet Kaur
(74) *Attorney, Agent, or Firm* — Volentine, Whitt & Francos, PLLC

(57) ABSTRACT

A measurement device including: an ion-sensitive element; a reference electrode disposed in a state in which a measurement subject is interposed between the reference electrode and the ion-sensitive element; and a controller configured to: establish a first state at a predetermined interval, the first state being a state in which a current flows at the ion-sensitive element, and establish a second state within each period after the first state has been established and before the first state is next established, the second state being a state in which a potential difference between the ion-sensitive element and the reference electrode is greater than a potential difference between the ion-sensitive element and the reference electrode in the first state.

7 Claims, 19 Drawing Sheets

| REFRESH PERIOD | REFERENCE VOLTAGE Vr |
|---|---|
| < 1 MIN. | 5 V |
| 1 - 2 MIN. | 4.5 V |
| 2 - 3 MIN. | 4.0 V |
| 3 - 4 MIN. | 3.5 V |
| 4 - 5 MIN. | 3.2 V |
| > 5 MIN. | 3.0 V |

| MEASUREMENT INTERVAL | TEMPERATURE | REFRESH PERIOD | REFERENCE ELECTRODE VOLTAGE |
|---|---|---|---|
| 10 – 15 MIN. | < 25°C | 5 MIN. | 3 V |
| | 25 – 30°C | 6 MIN. | 3 V |
| | 30 – 35°C | 7 MIN. | 4 V |
| | 35 – 40°C | 8 MIN. | 4 V |
| | 40 – 45°C | 9 MIN. | 5 V |
| 15 – 20 MIN. | 20 – 25°C | 10 MIN. | 3 V |
| | 25 – 30°C | 11 MIN. | 3 V |
| | 30 – 35°C | 12 MIN. | 4 V |
| | 35 – 40°C | 13 MIN. | 4 V |
| | 40 – 45°C | 14 MIN. | 5 V |
| 20 – 25 MIN. | 20 – 25°C | 15 MIN. | 3 V |
| | 25 – 30°C | 16 MIN. | 3 V |
| | 30 – 35°C | 17 MIN. | 4 V |
| | 35 – 40°C | 18 MIN. | 4 V |
| | 40 – 45°C | 19 MIN. | 5 V |
| ... | ... | ... | ... |

MEASUREMENT DEVICE AND MEASUREMENT METHOD

CROSS-REFERENCE TO RELATED APPLICATION

This application claims priority under 35 USC 119 from Japanese Patent Application No. 2018-099729, filed on May 24, 2018, the disclosure of which is incorporated by reference herein.

BACKGROUND

Technical Field

The present disclosure relates to a measurement device equipped with an ion-sensitive element and to a measurement method.

Related Art

The following are known as technologies relating to a measurement device equipped with an ion-sensitive element. For example, Japanese Patent Application Laid-Open (JP-A) No. 2017-110978 recites an ion sensor equipped with: a support substrate; plural cells that are sensitive to ions of a sample; plural transistors that read and transfer signals corresponding to ion amounts sensed by the cells; and an analog/digital converter that converts the analog signals transferred from the transistors to digital signals.

IEEE ELECTRON DEVICE LETTERS, VOL. 34, NO. 3, MARCH 2013; David Welch, Sahil Shah, Sule Ozev, and Jennifer Blain Christen: "Experimental and Simulated Cycling of ISFET Electric Fields for Drift Reset" recites a drift correction technology for an ion-sensitive field effect transistor (ISFET) being used as an ion-sensitive element.

A measurement device equipped with an ion-sensitive element outputs electronic signals representing a hydrogen ion index (below referred to as the pH value), which is a physical quantity representing a level of acidity or alkalinity of a measurement subject. In the measurement device equipped with the ion-sensitive element, a phenomenon of drift, in which output varies with the passage of time.

FIG. 1 is a graph illustrating an example of changes over time of a variation amount $\Delta Vo$ from an initial value of output voltage, in a case in which a measurement device equipped with an ISFET is used to measure pH values of a standard liquid with a pH of 6.86. As illustrated in FIG. 1, even though the pH value of the measurement subject is constant, the output of the measurement device equipped with the ISFET varies with the passage of time. This phenomenon is referred to as drift.

A measurement device equipped with an ion-sensitive element can be employed as, for example, a soil sensor for acquiring soil environment information that is important for field management in agriculture. An expected mode of employment for a soil sensor is, for example, IoT (Internet of Things) soil environment monitoring in which the soil sensor is embedded in the soil, pH values of the soil are acquired periodically, and acquired data is sent over a network to a server by wireless communications. For a soil sensor for which this mode of employment is expected, it is required that continuous, accurate pH values be periodically measured over long periods (for example, a year). Therefore, eliminating output variations due to drift is desirable.

SUMMARY

The present disclosure provides a measurement device equipped with an ion-sensitive element that may suppresses output variations caused by drift.

A first aspect of the present disclosure is a measurement device including: an ion-sensitive element; a reference electrode disposed in a state in which a measurement subject is interposed between the reference electrode and the ion-sensitive element; and a controller configured to: establish a first state at a predetermined interval, the first state being a state in which a current flows at the ion-sensitive element, and establish a second state within each period after the first state has been established and before the first state is next established, the second state being a state in which a potential difference between the ion-sensitive element and the reference electrode is greater than a potential difference between the ion-sensitive element and the reference electrode in the first state.

A second aspect of the present disclosure is a measurement method for using a measurement device to measure a characteristic of a measurement subject, the measurement device including an ion-sensitive element and a reference electrode disposed in a state in which the measurement subject is interposed between the reference electrode and the ion-sensitive element, and the measurement method including: establishing a first state at a predetermined interval, the first state being a state in which a current flows at the ion-sensitive element, and establishing a second state within each period after the first state has been established and before the first state is next established, the second state being a state in which a potential difference between the ion-sensitive element and the reference electrode is greater than a potential difference between the ion-sensitive element and the reference electrode in the first state.

According to the above aspects, the present disclosure provides a measurement device equipped with an ion-sensitive element that may suppress output variations caused by drift.

BRIEF DESCRIPTION OF THE DRAWINGS

Exemplary embodiments will be described in detail based on the following figures, wherein:

FIG. 13 is a diagram illustrating a configuration of a table relating to the exemplary embodiment of the present disclosure;

FIG. 18 is a diagram illustrating a configuration of a table relating to the exemplary embodiment of the present disclosure.

DETAILED DESCRIPTION

Figure 1:
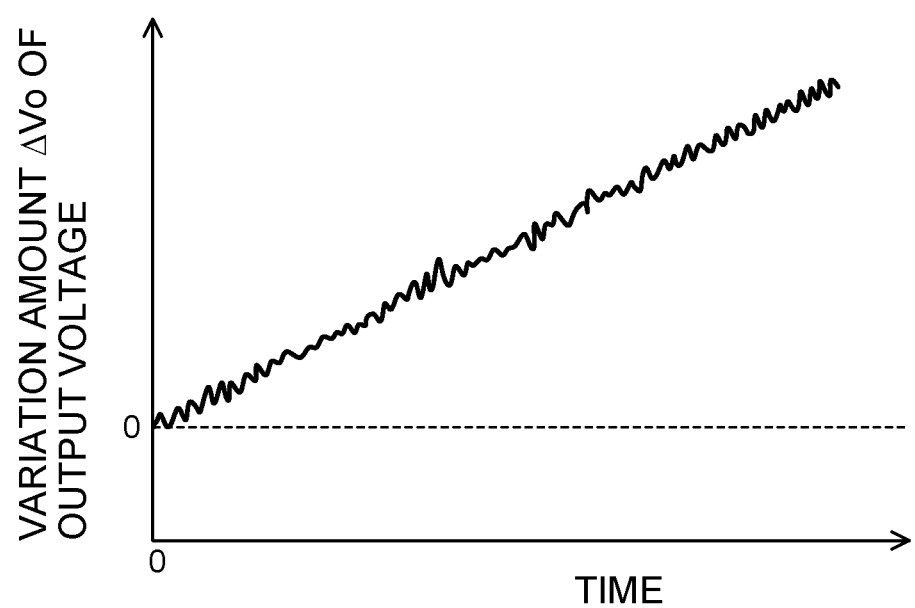
FIG. 1 is a graph illustrating changes over time of variation amounts from an initial value of output voltage in a case in which a measurement device equipped with an ISFET is used to measure pH values of a measurement subject.

Below, examples of embodiments of the present disclosure are described with reference to the attached drawings. In the drawings, the same reference symbols are assigned to elements and portions that are the same or equivalent.

First Exemplary Embodiment

Figure 2:
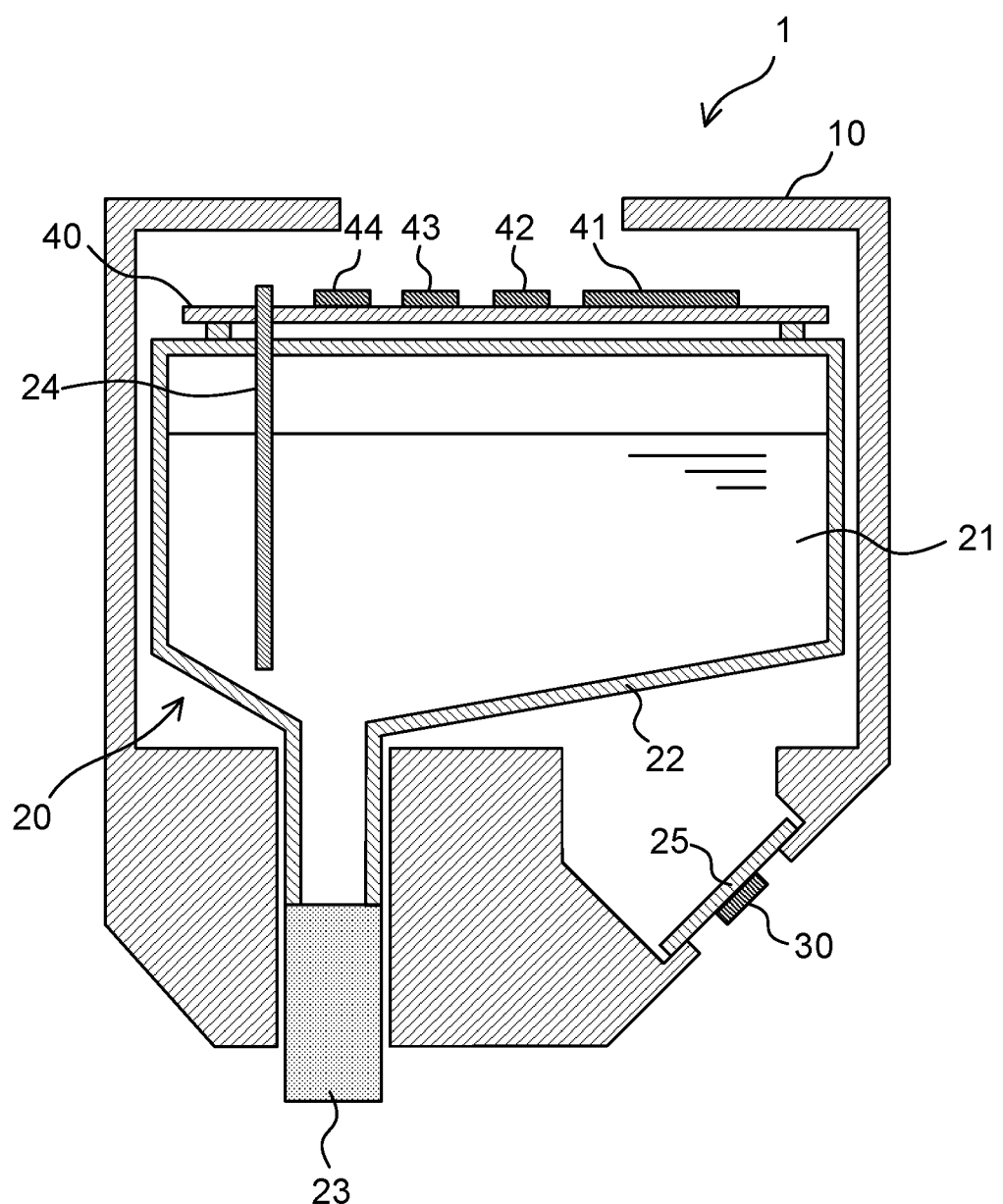
FIG. 2 is a sectional diagram illustrating configurations of a measurement device relating to an exemplary embodiment of the present disclosure.

FIG. 2 is a sectional diagram illustrating an example of configurations of a measurement device 1 relating to an exemplary embodiment of the present disclosure. The measurement device 1 features a function for outputting electronic signals representing pH values of measurement subjects.

The measurement device 1 includes a reference electrode 20 accommodated inside a casing body 10. The reference electrode 20 includes a container 22, a liquid junction portion 23 and an internal electrode 24. The container 22 accommodates an internal liquid 21. The liquid junction portion 23 is provided at a distal end of the container 22. A portion of the internal electrode 24 is immersed in the internal liquid 21 inside the container 22. As the internal liquid 21, for example, a potassium chloride (KCl) solution or a sodium chloride (NaCl) solution may be employed. The liquid junction portion 23 is configured of, for example, porous glass. The internal liquid 21 accommodated in the container 22 effuses to outside the measurement device 1 through the liquid junction portion 23. The internal electrode 24 is configured with, for example, silver (Ag) or silver chloride (AgCl).

The measurement device 1 includes a sensor circuit board 25 attached to the casing body 10. An ISFET 30, which is an example of an ion-sensitive element, is provided on the sensor circuit board 25. The ISFET 30 is equipped with an ion-sensitive film 31 (see FIG. 3). A drain-source current of the ISFET 30 is controlled by a surface potential of the ion-sensitive film 31, which is generated by ion activity of the measurement subject.

A control circuit board 40 is attached to an upper face of the container 22. A control section 41, an analog/digital converter 42, power sources 43 and 44, and so forth are mounted at the control circuit board 40. The internal electrode 24 penetrates through the control circuit board 40 and a distal end portion of the internal electrode 24 reaches an upper face of the control circuit board 40.

Figure 3:
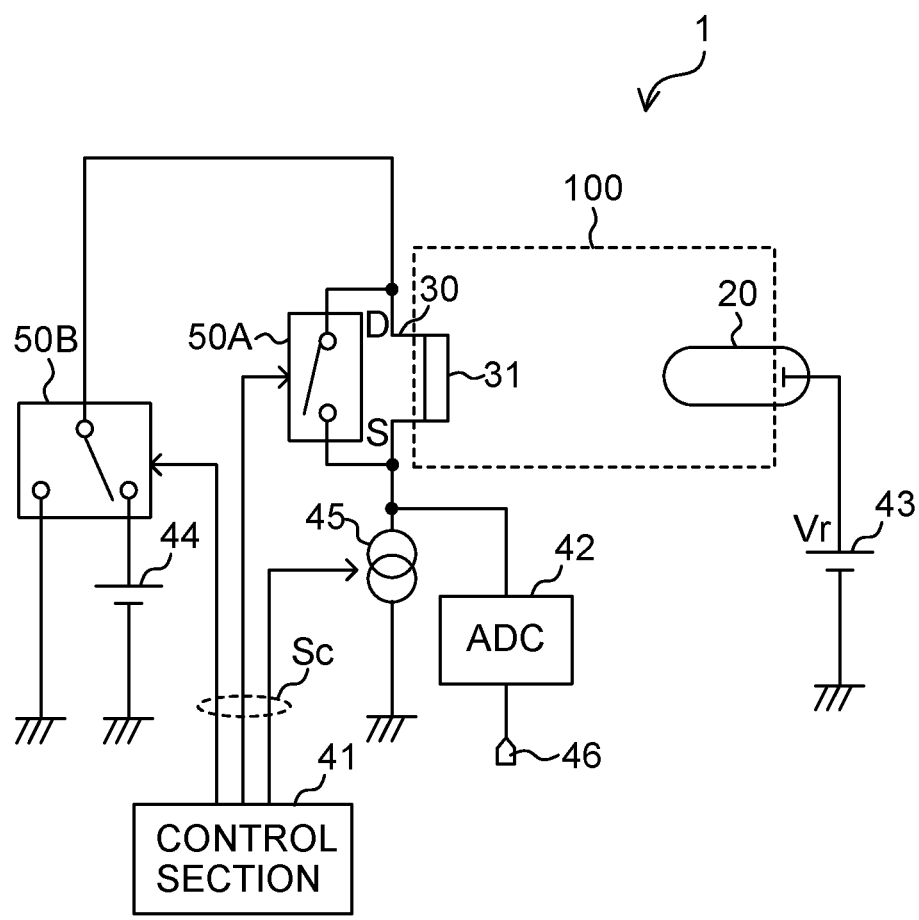
FIG. 3 is a diagram illustrating electronic configurations of the measurement device relating to the exemplary embodiment of the present disclosure.

FIG. 3 is a diagram illustrating an example of electronic configurations of the measurement device 1. A pH value of a measurement subject 100 by the measurement device 1 is measured in a state in which the reference electrode 20 and the ion-sensitive film 31 of the ISFET 30 are in contact with the measurement subject 100. The reference electrode 20 is connected to the power source 43; a reference voltage Vr outputted from the power source 43 is applied to the reference electrode 20 via the internal electrode 24.

A switch 50A is provided between the source and drain of the ISFET 30. In a case in which the switch 50A is in the ON state thereof, the source and drain of the ISFET 30 are short-circuited. In a case in which the switch 50A is in the OFF state, the source and drain of the ISFET 30 are open-circuited. A switch 50B is connected to the drain of the ISFET 30. The switch 50B selectively connects the drain of the ISFET 30 with the power source 44 or with ground. The source of the ISFET 30 is connected with a current source 45 and with the analog/digital converter 42.

By outputting control signals Sc, the control section 41 performs control to switch the switches 50A and 50B and control to turn the current source 45 ON and OFF. The switches 50A and 50B and the current source 45 are mounted at either of the sensor circuit board 25 and the control circuit board 40. The wiring connecting the structural elements that is illustrated in FIG. 3 is configured by conductor patterns (not illustrated in the drawings) formed on the sensor circuit board 25 and the control circuit board 40 and by a wire harness connecting the sensor circuit board 25 with the control circuit board 40.

Figure 4A:
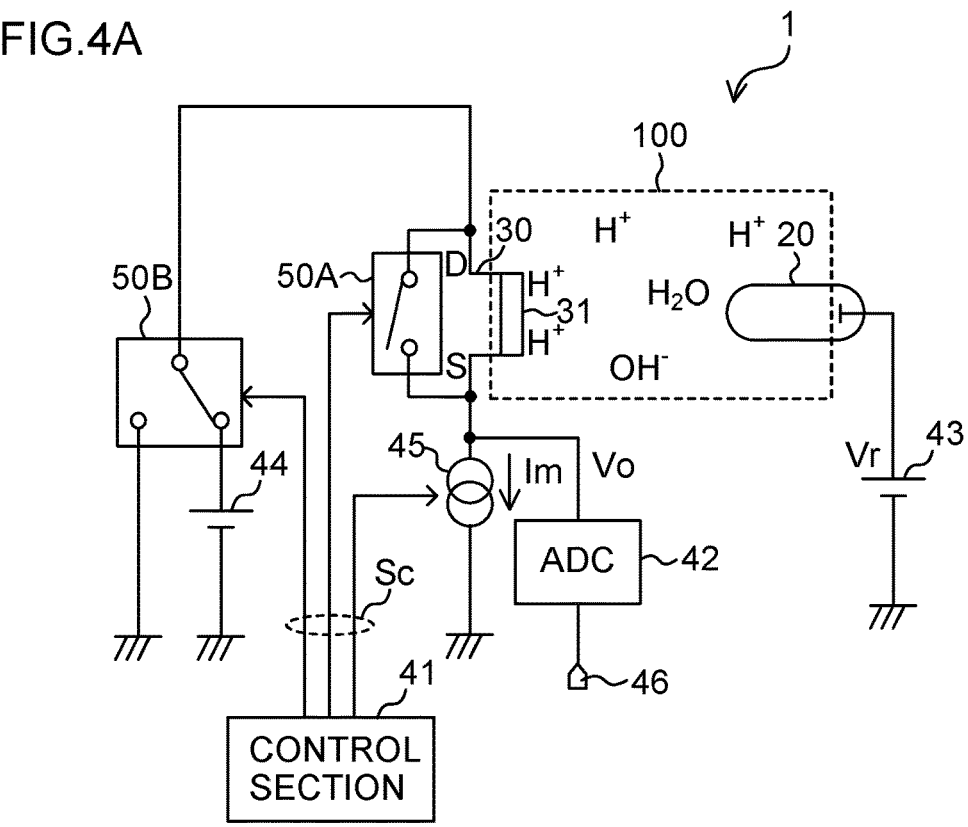
FIG. 4A is a diagram illustrating a measurement device of a measurement subject relating to the exemplary embodiment of the present disclosure.

FIG. 4A is a diagram illustrating an example of a state of the measurement device 1 (below referred to as the measurement state) in a case in which the measurement device 1 is measuring a pH value of the measurement subject 100. The control section 41 puts the measurement device 1 into the measurement state by putting the switch 50A into the OFF state, switching the switch 50B to the side connecting with the power source 44, and turning ON the current source 45. In the measurement state, the reference voltage Vr outputted from the power source 43 is applied to the reference electrode 20. In a case in which the reference voltage Vr is applied to the measurement subject 100 via the reference electrode 20 in the measurement state, hydrogen ions ($H^+$) contained in the measurement subject 100 collect at the surface of the ion-sensitive film 31 of the ISFET 30. As a result, the surface potential of the ion-sensitive film 31 has a magnitude corresponding to the pH value of the measurement subject 100, and a measurement current Im flows in the ISFET 30. Consequently, the level of the source voltage of the ISFET 30 is a level corresponding to the pH value of the measurement subject 100. The source voltage of the ISFET 30 is an output voltage Vo representing the pH value of the measurement subject 100, which is converted to a digital value by the analog/digital converter 42 and outputted through an output terminal 46. The control section 41 performs control to establish the measurement state illustrated in FIG. 4A at a predetermined interval. Thus, the control section 41 performs control to measure pH values of the measurement subject 100 at the predetermined interval. It is sufficient that the measurement state be established as a state that provides an output corresponding to the pH value of the measurement subject 100, in a case in which the measurement current Im flows in the ISFET 30. Note that the configuration of circuit connections in the measurement state is not limited to the configuration in FIG. 4A.

In the measurement device 1 equipped with the ISFET 30, there is an issue with drift, in which the output voltage Vo varies with the passage of time (see FIG. 1). Drift occurs due to continuous changes in the surface potential of the ion-sensitive film 31. Accordingly, the measurement device 1 moderates the effects of drift by refreshing the surface potential of the ion-sensitive film 31 to an initial state thereof.

Figure 4B:
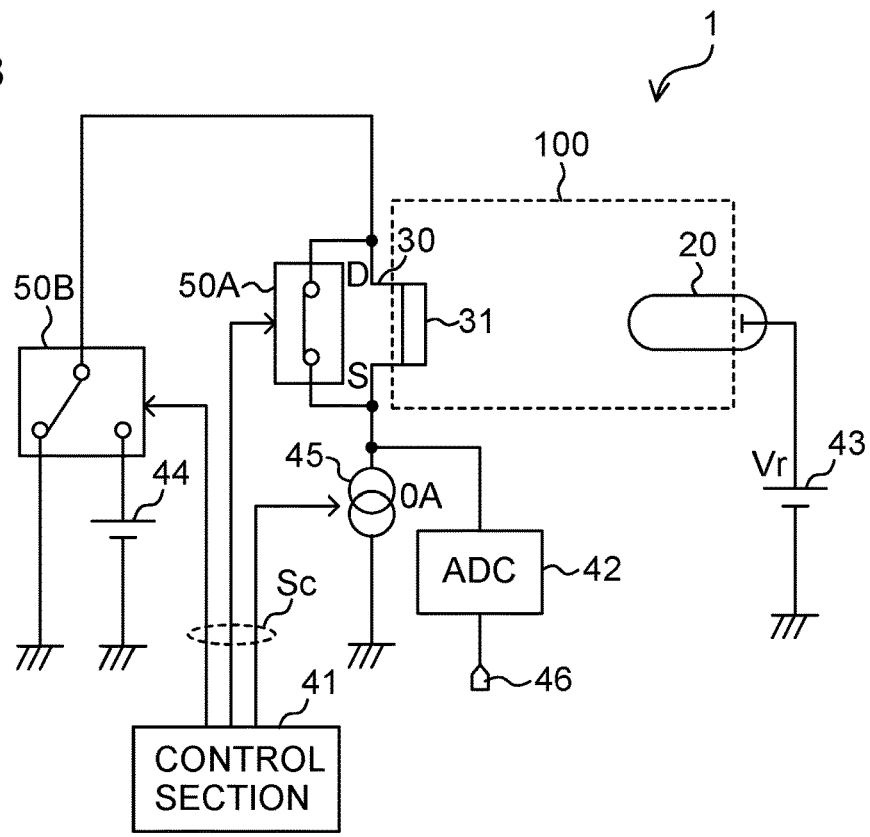
FIG. 4B is a diagram illustrating a refresh state of the measurement device relating to the exemplary embodiment of the present disclosure.

FIG. 4B is a diagram illustrating an example of a state of the measurement device 1 (below referred to as the refresh state) in a case in which the surface potential of the ion-sensitive film 31 is being refreshed. The control section 41 puts the measurement device 1 into the refresh state by putting the switch 50A into the on state, switching the switch 50B to the side connecting with ground, and turning OFF the current source 45. In the refresh state, the reference voltage Vr is applied to the reference electrode 20 at the same level as in the measurement state. In the refresh state, potentials of the source and drain of the ISFET 30 are at ground potential. Therefore, a potential difference between the ISFET 30 and the reference electrode 20 is greater than a potential difference between the ISFET 30 and the reference electrode 20 in the measurement state. As a result, the surface potential of the ion-sensitive film 31 is refreshed to the initial state thereof, and variations in the output voltage Vo caused by drift are suppressed. It is sufficient that the potential difference between the ISFET 30 and the reference electrode 20 in the refresh state be greater than the potential difference between the ISFET 30 and the reference electrode 20 in the measurement state. Note that the configuration of circuit connections in the refresh state is not limited to the configuration illustrated in FIG. 4B.

Figure 5:
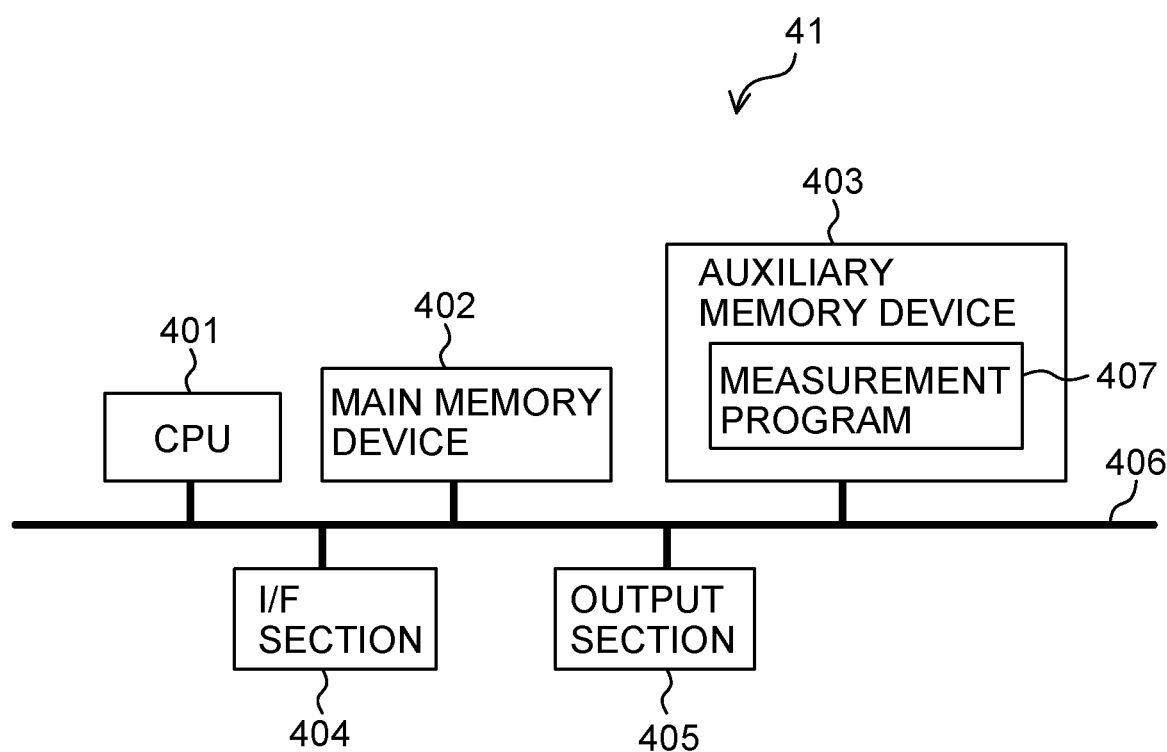
FIG. 5 is a diagram illustrating hardware configurations of a controller relating to the exemplary embodiment of the present disclosure.

FIG. 5 is a diagram illustrating an example of hardware configurations of the control section 41. The control section 41 is configured by, for example, a microcomputer. The control section 41 includes a central processing unit (CPU) 401, a main memory device 402 that serves as a temporary storage area, a non-volatile auxiliary memory device 403, an interface section (I/F section) 404 that receives signals from outside the control section 41, and an output section 405 that outputs the control signals Sc. The CPU 401, the main memory device 402, the auxiliary memory device 403, the I/F section 404 and the output section 405 are each connected to a bus 406. A measurement program 407 describing a procedure of measurement processing by the measurement device 1 is stored in the auxiliary memory device 403. The control section 41 carries out the measurement processing by the CPU 401 executing the measurement program 407.

Figure 6:
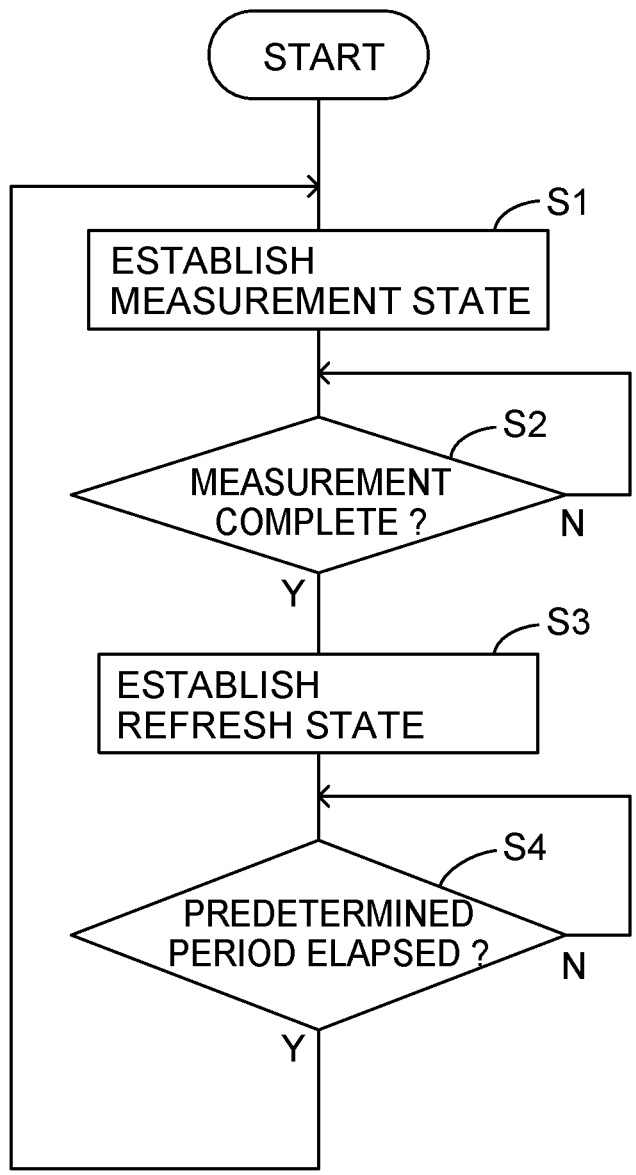
FIG. 6 is a flowchart illustrating a flow of measurement processing relating to the exemplary embodiment of the present disclosure.

FIG. 6 is a flowchart illustrating an example of flow of the measurement processing that is executed at the control section 41 when measuring a pH value of the measurement subject 100.

In step S1, the control section 41 puts the switch 50A into the OFF state, switches the switch 50B to the side connecting with the power source 44 and turns ON the current source 45, thus establishing the measurement state (see FIG. 4A). Hence, an output voltage Vo representing the pH value of the measurement subject 100 is converted to a digital value by the analog/digital converter 42 and outputted through the output terminal 46.

In step S2, the control section 41 makes a determination as to whether the measurement of the pH value of the measurement subject 100 is complete. In a case in which the control section 41 determines that the measurement of the pH value of the measurement subject 100 is complete, the control section 41 proceeds to step S3.

In step S3, the control section 41 puts the switch 50A into the on state, switches the switch 50B to the side connecting with ground and turns OFF the current source 45, establishing the refresh state (see FIG. 4B). In the refresh state, the potential difference between the ISFET 30 and the reference electrode 20 is greater than the potential difference between the ISFET 30 and the reference electrode 20 in the measurement state. As a result, the surface potential of the ion-sensitive film 31 is refreshed to the initial state. Thus, variations of the output voltage Vo due to drift may be suppressed.

In step S4, the control section 41 makes a determination as to whether a predetermined period has elapsed since the establish of the refresh state. The effect of suppressing variations in the output voltage Vo by establishing the refresh state varies depending on a period of continuation of the refresh state (below referred to as the refresh period). The predetermined period is set to a period that provides a thorough effect of suppressing variations in the output voltage Vo. In a case in which the control section 41 determines that the predetermined period has elapsed since establish of the refresh state, the control section 41 returns to step S1.

Figure 7A:
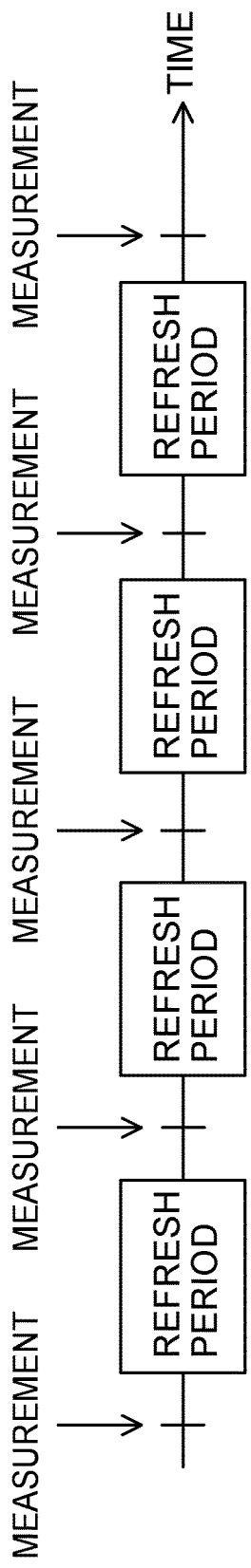
FIG. 7A is a diagram illustrating a measurement sequence relating to the exemplary embodiment of the present disclosure.

FIG. 7A is a diagram illustrating an example of a measurement sequence in a case in which the measurement processing illustrated in FIG. 6 is executed. According to the measurement processing relating to the present exemplary embodiment, the measurement state is established at the predetermined interval, and pH values of the measurement subject 100 are measured at the predetermined interval. After the measurement state has been established, the refresh state is established within a period before the measurement state is next established. That is, the surface potential of the ion-sensitive film 31 is refreshed after each measurement, and before the next measurement is started. Consequently, at the next measurement, the pH value of the measurement subject 100 may be measured in a state in which the effect of drift has been moderated.

Figure 8:
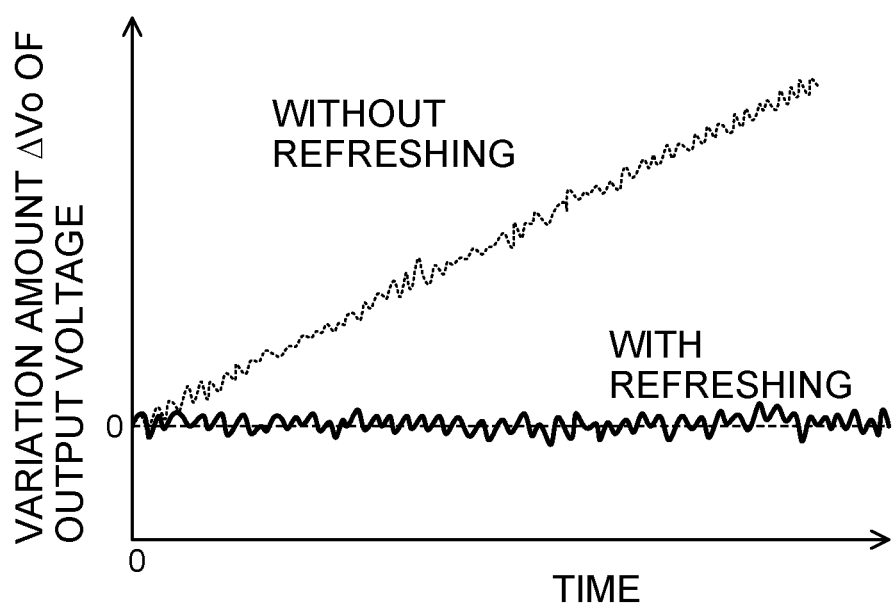
FIG. 8 is a graph illustrating changes over time of variation amounts from an initial value of output voltage in a case in which the measurement device relating to the exemplary embodiment of the present disclosure measures pH values of a measurement subject.

FIG. 8 is a graph illustrating an example of changes over time of the variation amount ΔVo from the initial value of the output voltage Vo in a case in which the measurement device 1 measures pH values of a standard liquid with a pH of 6.86. In FIG. 8, the solid line corresponds to a case of executing the measurement processing illustrated in FIG. 6, which is to say establishing the refresh state after each measurement and before the next measurement, and the dotted line corresponds to a case in which the refresh state is not established, which is a comparative example. In the case in which the refresh state is not established, the variation amount ΔVo of the output voltage Vo increases with the passage of time. In contrast, according to the measurement device 1 relating to an exemplary embodiment, the refresh state is established in the period between the measurement state being established and the measurement state being next established. Thus, the surface potential of the ion-sensitive film 31 is refreshed before each measurement. As a result, variation amounts ΔVo of the output voltage Vo with the passage of time may be kept small. In other words, according to the measurement device 1, output variations caused by drift may be suppressed.

Figure 7B:
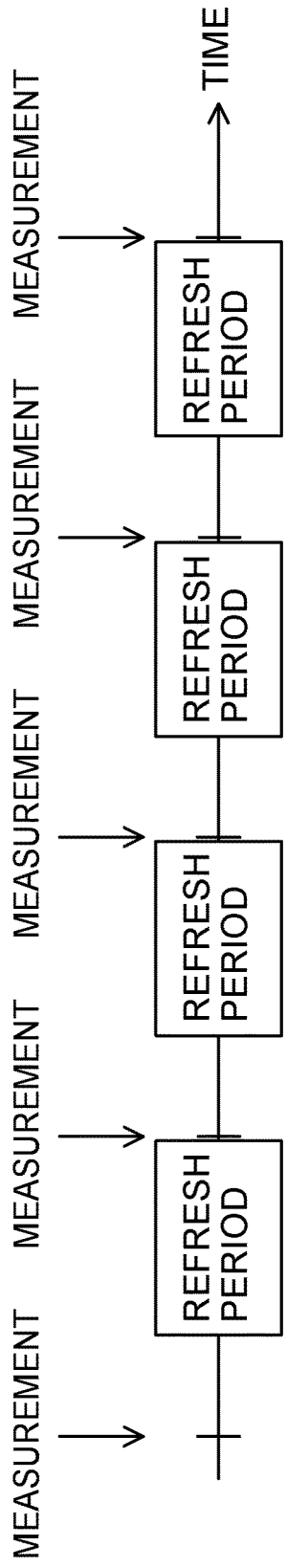
FIG. 7B is a diagram illustrating an alternative example of a measurement sequence relating to the exemplary embodiment of the present disclosure.

FIG. 7B is a diagram illustrating an alternative example of a measurement sequence. As illustrated in FIG. 7B, the refresh period may be set to a predetermined period just before a measurement is started. That is, the control section 41 may establish the refresh state for this predetermined period just before the measurement state is established. This is because, in a period between the end of the refresh state and a transition into the measurement state, the measurement device 1 is in a standby state. In the standby state, the source and drain of the ISFET 30 and the reference electrode 20 are disconnected from the circuit, and are therefore each in a floating state. In the standby state, variation of the output voltage Vo proceeds due to drift; the longer a period of continuation of the standby state (below referred to as a standby period), the greater the variation amount of the output voltage Vo. In contrast, in a case in which the predetermined period just before the start of measurement is used as the refresh period as illustrated in FIG. 7B, variation of the output voltage Vo may be suppressed compared to a situation in which this predetermined period is used as a standby period.

The measurement device 1 according to the exemplary embodiment of the present disclosure may be used as, for example, a soil sensor for acquiring soil environment information. In a case in which the measurement device 1 is used as a soil sensor, the measurement device 1 is embedded in the soil and periodically acquires pH values of the soil. The data acquired by the measurement device 1 may be sent over a network to a server by wireless communications, by a communications module (not illustrated in the drawings) mounted at the measurement device 1. Because output variations caused by drift may be suppressed according to the measurement device 1, continuous, accurate pH values may be measured over long periods (for example, a year).

Second Exemplary Embodiment

Figure 9:
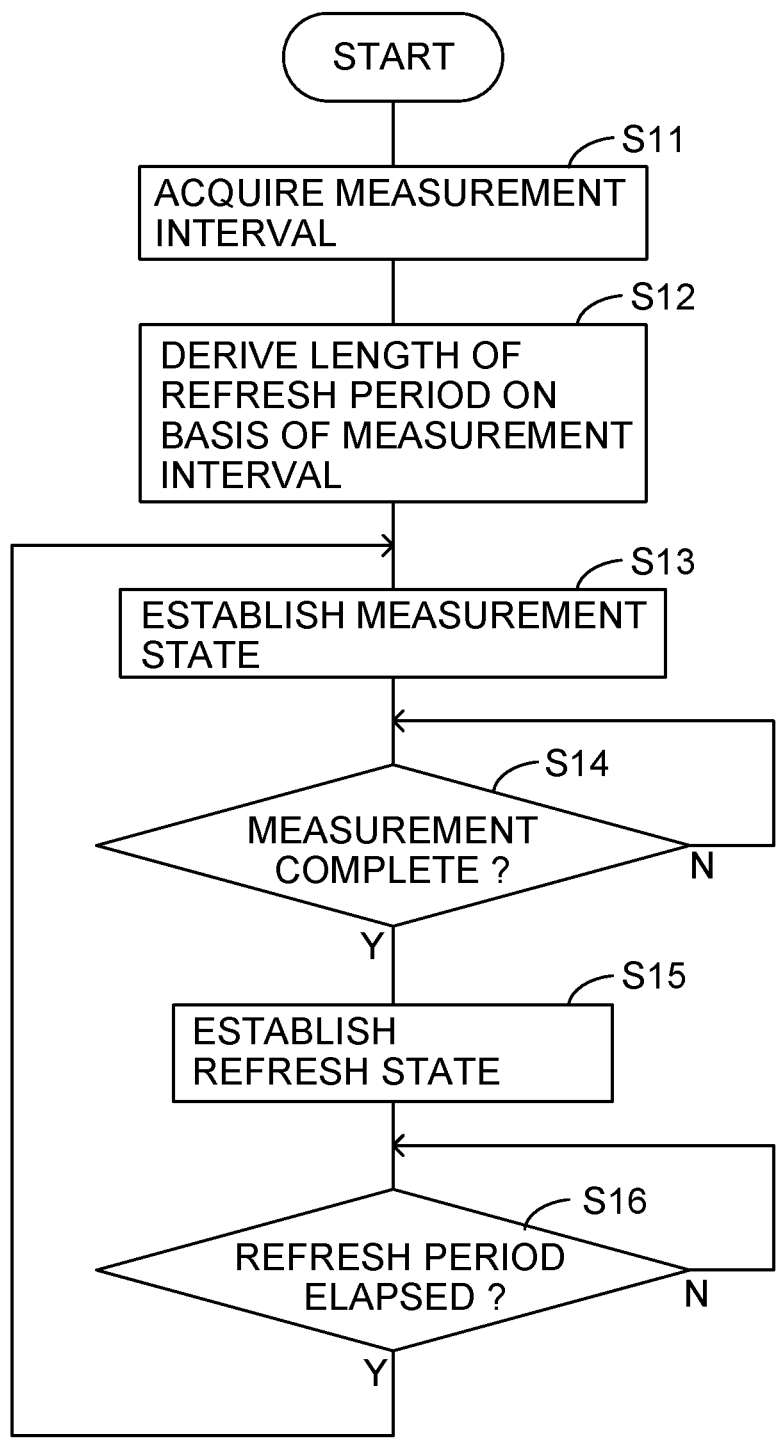
FIG. 9 is a flowchart illustrating a flow of measurement processing relating to an exemplary embodiment of the present disclosure.

FIG. 9 is a flowchart illustrating an example of a flow of measurement processing relating to a second exemplary embodiment of the present disclosure, which processing is executed by the control section 41.

In step S11, the control section 41 acquires the measurement interval at which pH values of the measurement subject 100 are to be measured. The measurement interval corresponds to a period from the measurement state being established until the measurement state is next established. The measurement interval is described in the measurement program 407. Thus, the control section 41 acquires the measurement interval by loading the measurement program 407 into the main memory device 402. The control section 41 may acquire a measurement interval that is entered by user operations.

In step S12, the control section 41 derives the length of the refresh period on the basis of the measurement period acquired in step S11. The control section 41 derives the length of the refresh period such that the refresh period is accommodated within the period corresponding to the measurement interval. For example, the control section 41 may derive the length of the refresh period such that a ratio of the refresh period to the measurement interval is a predetermined value. Alternatively, the control section 41 may derive the length of the refresh period such that a period from the end of the refresh period until the start of the next measurement is shorter than a predetermined period. The control section 41 may refer to a table in which combinations of measurement intervals and refresh periods are recorded for respective measurement intervals to derive the length of the refresh period corresponding to the measurement interval.

In step S13, the control section 41 puts the switch 50A into the OFF state, switches the switch 50B to the side connecting with the power source 44 and turns ON the current source 45, establishing the measurement state (see FIG. 4A). Hence, an output voltage Vo representing the pH value of the measurement subject 100 is converted to a digital value by the analog/digital converter 42 and outputted through the output terminal 46.

In step S14, the control section 41 makes a determination as to whether the measurement of the pH value of the measurement subject 100 is complete. In a case in which the control section 41 determines that the measurement of the pH value of the measurement subject 100 is complete, the control section 41 proceeds to step S15.

In step S15, the control section 41 puts the switch 50A into the ON state, switches the switch 50B to the side connecting with ground and turns OFF the current source 45, establishing the refresh state (see FIG. 4B). In the refresh state, the potential difference between the ISFET 30 and the reference electrode 20 is greater than the potential difference between the ISFET 30 and the reference electrode 20 in the measurement state. As a result, the surface potential of the ion-sensitive film 31 is refreshed to the initial state. Thus, variations of the output voltage Vo due to drift may be suppressed.

In step S16, the control section 41 makes a determination as to whether the refresh period with the length derived in step S12 has elapsed since establish of the refresh state. In a case in which the control section 41 determines that the refresh period has elapsed, the control section 41 returns to step S13.

Figure 10A:
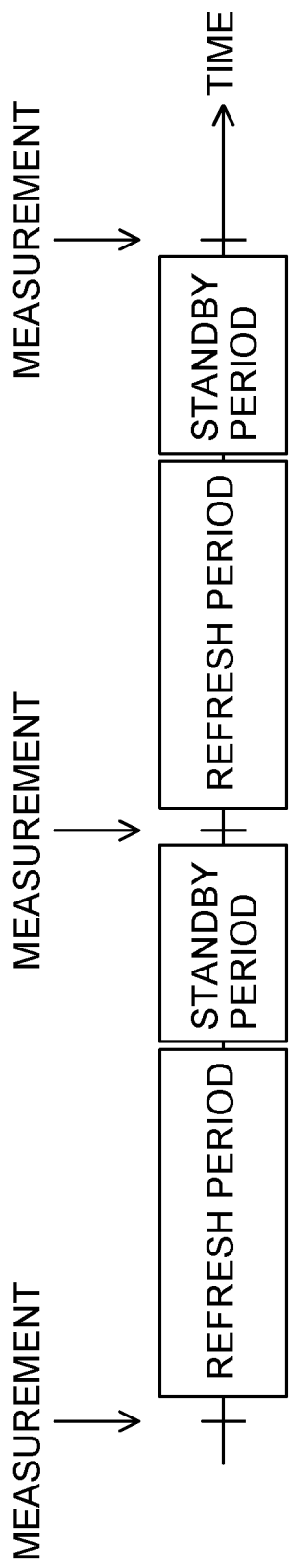
FIG. 10A is a diagram illustrating a measurement sequence relating to the exemplary embodiment of the present disclosure.

FIG. 10A is a diagram illustrating an example of a measurement sequence in a case in which the measurement processing illustrated in FIG. 9 is executed. According to the measurement processing relating to the present exemplary embodiment, similarly to the measurement processing relating to the first exemplary embodiment, the measurement state is established at the predetermined interval and pH values of the measurement subject 100 are measured at the predetermined interval. After the measurement state has been established, the refresh state is established within the period before the measurement state is next established. In addition, according to the measurement processing relating to the present exemplary embodiment, the length of the refresh period is set on the basis of the measurement interval.

Figure 10B:
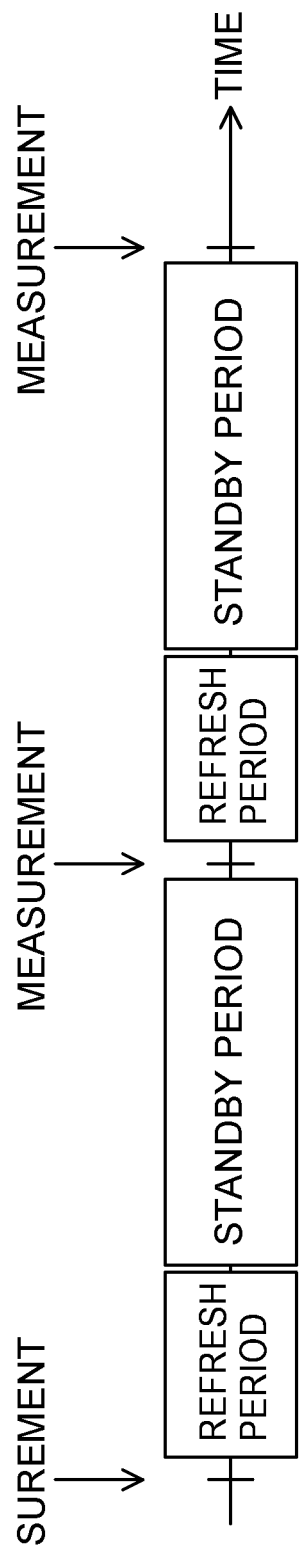
FIG. 10B is a diagram illustrating a measurement sequence in a case in which a refresh period is a fixed period.

FIG. 10B is a diagram illustrating an example of a measurement sequence if the refresh period is set to a fixed period. In a case in which the refresh period is set to a fixed period, then if the measurement interval is relatively long as illustrated in FIG. 10B, a standby period between the end of the refresh period and the start of the next measurement may be relatively long. As mentioned above, variation of the output voltage Vo due to drift proceeds in the standby period, as a result of which the refresh effect may be impaired. In contrast, according to the measurement processing relating to the present exemplary embodiment, because the length of the refresh period is set on the basis of the measurement interval, the standby period may be kept short. Therefore, the progress of variation of the output voltage Vo in a period between the end of the refresh period and the start of the next measurement may be suppressed.

Third Exemplary Embodiment

Figure 11:
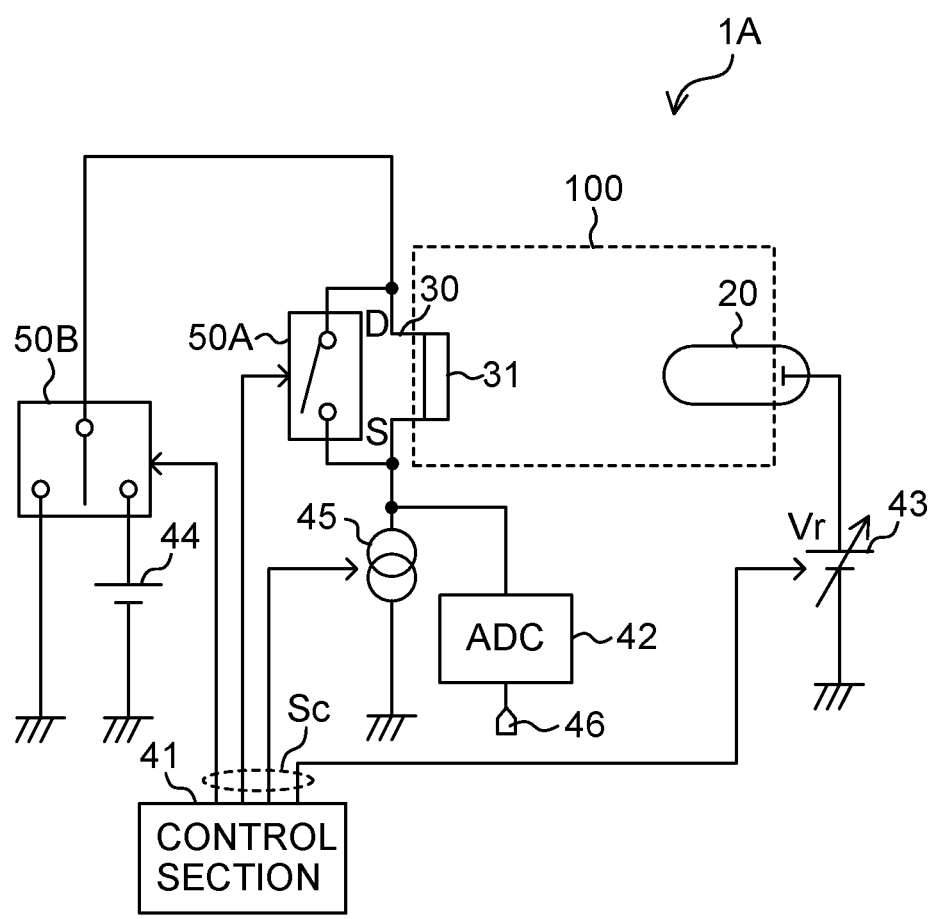
FIG. 11 is a diagram illustrating electronic configurations of a measurement device relating to an exemplary embodiment of the present disclosure.

FIG. 11 is a diagram illustrating an example of electronic configurations of a measurement device 1A according to a third exemplary embodiment of the present disclosure. In the measurement device 1A, the output voltage of the power source 43 is variable, and thus the reference voltage Vr applied to the reference electrode 20 is variable. The level of the reference voltage Vr is controlled by the control signals Sc outputted from the control section 41.

Figure 12:
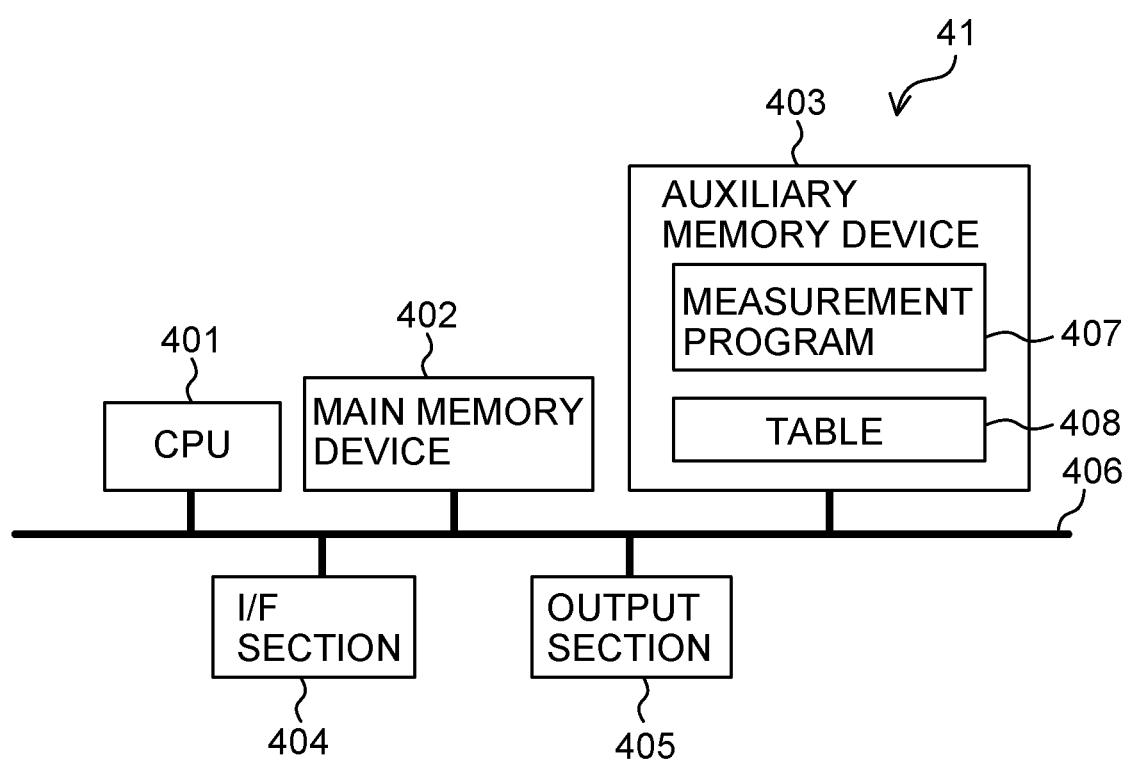
FIG. 12 is a diagram illustrating hardware configurations of a controller relating to the exemplary embodiment of the present disclosure.

FIG. 12 is a diagram illustrating an example of hardware configurations of the control section 41 according to the third exemplary embodiment of the present disclosure. In addition to the measurement program 407, a table 408 is stored in the auxiliary memory device 403.

FIG. 13 is a diagram illustrating an example of a configuration of the table 408. The table 408 is a database recording levels of the reference voltage Vr to be applied to the reference electrode 20 in the refresh state in association with lengths of the refresh period. The table 408 is configured such that the shorter the length of the refresh period, the higher the level of the reference voltage Vr.

Figure 14:
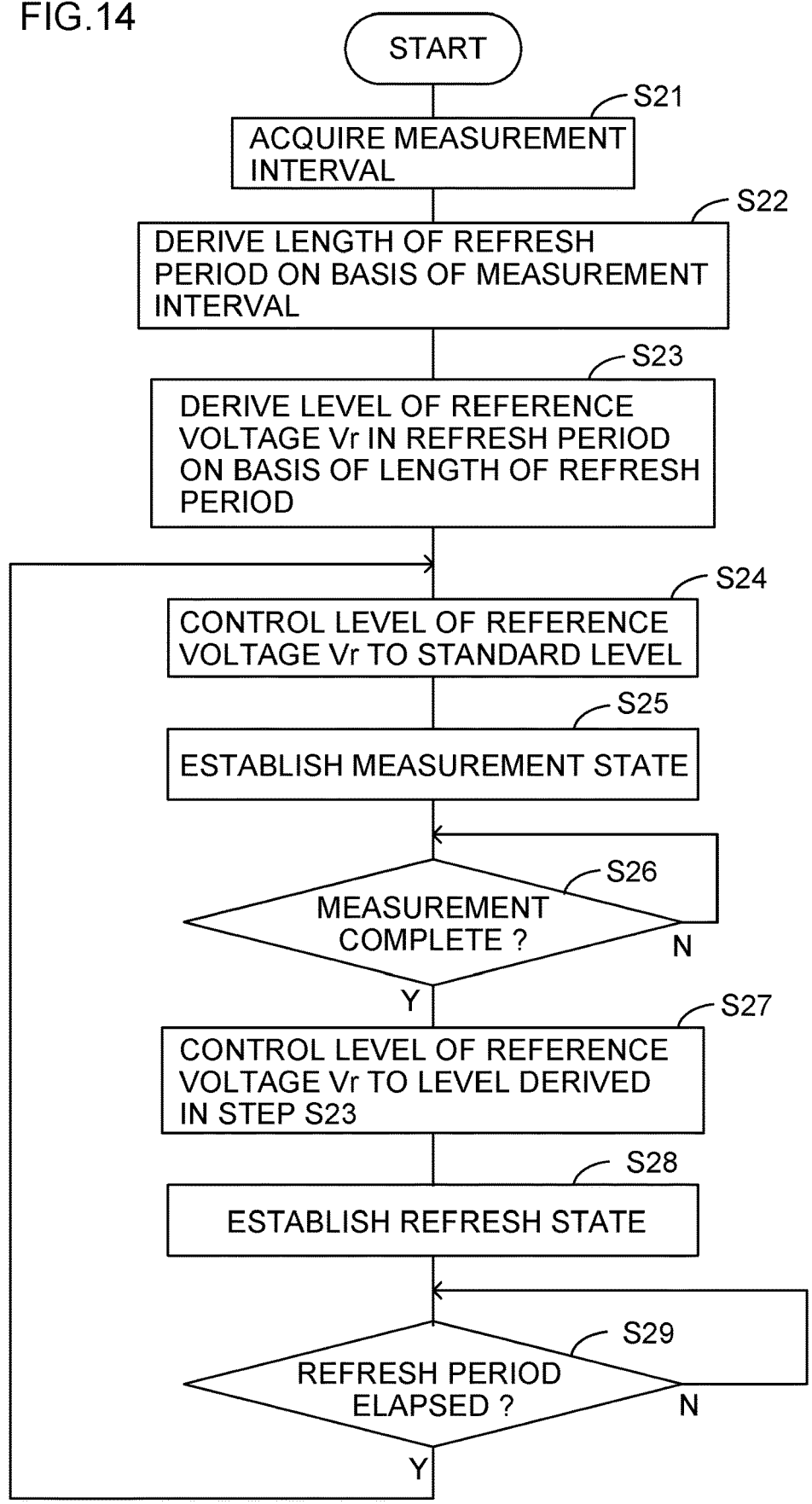
FIG. 14 is a flowchart illustrating a flow of measurement processing relating to the exemplary embodiment of the present disclosure.

FIG. 14 is a flowchart illustrating an example of a flow of measurement processing relating to the third exemplary embodiment of the present disclosure, which is executed by the control section 41.

In step S21, the control section 41 acquires the measurement interval at which pH values of the measurement subject 100 are to be measured. The measurement interval corresponds to a period from the measurement state being established until the measurement state is next established.

In step S22, the control section 41 derives the length of the refresh period on the basis of the measurement interval acquired in step S21. The control section 41 derives the length of the refresh period such that the length of the refresh period is accommodated within the period corresponding to the measurement interval.

In step S23, the control section 41 refers to the table 408 (see FIG. 13) to derive a level of the reference voltage Vr that corresponds to the length of the refresh period derived in step S22.

In step S24, the control section 41 provides the control signals Sc to the power source 43, controlling the level of the reference voltage Vr to a pre-specified reference level for measurement.

In step S25, the control section 41 puts the switch 50A into the OFF state, switches the switch 50B to the side connecting with the power source 44 and turns ON the current source 45, establishing the measurement state (see FIG. 4A). Hence, an output voltage Vo representing the pH value of the measurement subject 100 is converted to a digital value by the analog/digital converter 42 and outputted through the output terminal 46.

In step S26, the control section 41 makes a determination as to whether the measurement of the pH value of the measurement subject 100 is complete. In a case in which the control section 41 determines that the measurement of the pH value of the measurement subject 100 is complete, the control section 41 proceeds to step S27.

In step S27, the control section 41 provides the control signals Sc to the power source 43, controlling the level of the reference voltage Vr to the level derived in step S23.

In step S28, the control section 41 puts the switch 50A into the on state, switches the switch 50B to the side connecting with ground and turns OFF the current source 45, establishing the refresh state (see FIG. 4B). Hence, the source and drain of the ISFET 30 are connected to ground potential, and the reference voltage Vr at the level derived in step S23 is applied to the reference electrode 20. In the refresh state, the potential difference between the ISFET 30 and the reference electrode 20 is greater than the potential difference between the ISFET 30 and the reference electrode 20 in the measurement state. As a result, the surface potential of the ion-sensitive film 31 is refreshed to the initial state. Thus, variations of the output voltage Vo due to drift may be suppressed. The potential difference between the ISFET 30 and the reference electrode 20 is greater in correspondence with the level of the reference voltage Vr.

In step S29, the control section 41 makes a determination as to whether the refresh period with the length derived in step S22 has elapsed since establish of the refresh state. In a case in which the control section 41 determines that the refresh period has elapsed, the control section 41 returns the processing to step S24.

As described above, according to the measurement processing relating to the third exemplary embodiment of the present disclosure, the level of the reference voltage Vr in the refresh period, which is to say the potential difference between the ISFET 30 and the reference electrode 20, is controlled on the basis of the length of the refresh period. The effect of suppressing variations in the output voltage Vo caused by drift is promoted in a case in which the level of the reference voltage Vr in the refresh period is higher, that is, in a case in which the potential difference between the ISFET 30 and the reference electrode 20 is larger.

In a case in which the measurement interval is relatively short, assuring a long refresh period in order to thoroughly moderate the effects of drift can be expected to be difficult. According to the measurement processing relating to the present exemplary embodiment, control is performed such that the shorter the length of the refresh period, the higher the level of the reference voltage Vr in the refresh period. Therefore, even if the refresh period is short in accordance with the measurement interval, the effect of suppressing variations in the output voltage Vo is maintained by controlling the level of the reference voltage Vr.

In the present exemplary embodiment, a case in which the table 408 is used to derive the level of the reference voltage Vr in the refresh period, has been described. However, the present disclosure is not limited thereto. For example, the level of the reference voltage Vr in the refresh period may be derived by using a function representing a relationship between the length of the refresh period and the level of the reference voltage Vr. Further, control may be performed such that, if the refresh period derived on the basis of the measurement interval falls below a pre-specified minimum period, the level of the reference voltage Vr for that refresh period is raised relative to a standard level. In the present exemplary embodiment, a case in which the level of the reference voltage Vr is controlled on the basis of the refresh period that is derived on the basis of the measurement interval, has been described. However, the refresh period may be fixed and the level of the reference voltage Vr controlled on the basis of the measurement interval. In this case, control such that the shorter the measurement interval, the higher the level of the reference voltage Vr is preferable.

Fourth Exemplary Embodiment

Figure 15:
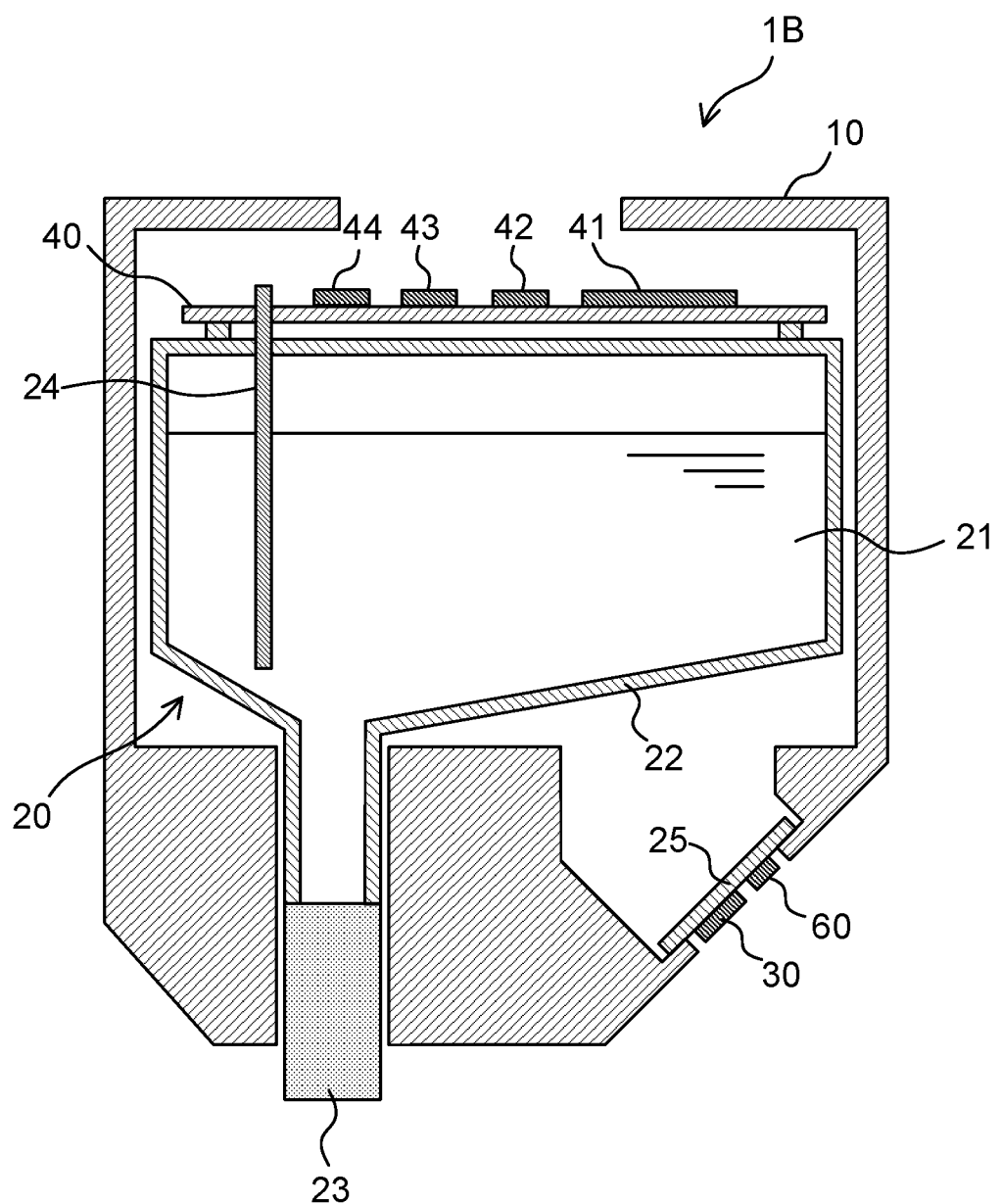
FIG. 15 is a sectional diagram illustrating configurations of a measurement device relating to an exemplary embodiment of the present disclosure.
Figure 16:
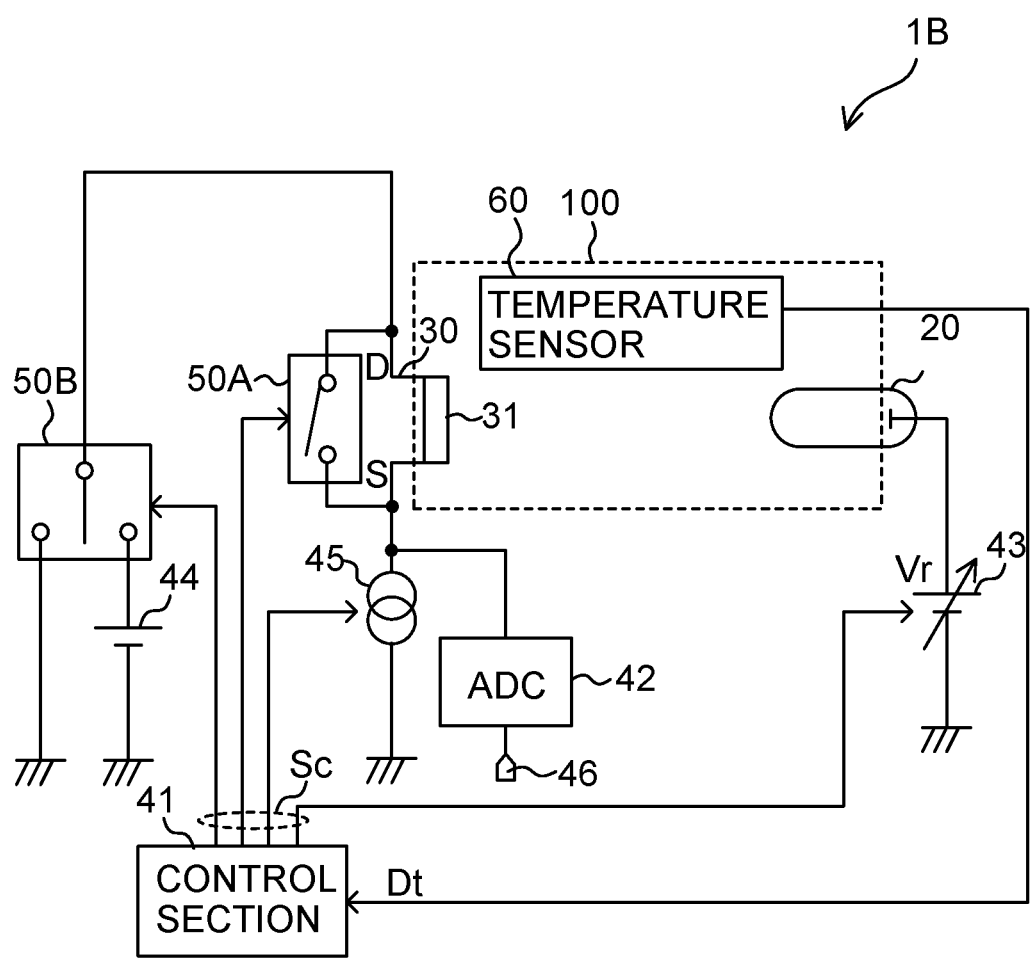
FIG. 16 is a diagram illustrating electronic configurations of the measurement device relating to the exemplary embodiment of the present disclosure.

FIG. 15 is a sectional diagram illustrating an example of configurations of a measurement device 1B according to a fourth exemplary embodiment of the present disclosure. FIG. 16 is a diagram illustrating an example of electronic configurations of the measurement device 1B. The measurement device 1B is equipped with a temperature sensor 60. As illustrated in FIG. 15, the temperature sensor 60 is provided on the sensor circuit board 25, adjacent to the ISFET 30. Measurements of pH values by the measurement device 1B are conducted in a state in which the reference electrode 20, the ion-sensitive film 31 and the temperature sensor 60 are in contact with the measurement subject 100. The temperature sensor 60 detects temperatures of the measurement subject 100 and provides temperature sensing signals Dt representing the detected temperatures to the control section 41.

Figure 17:
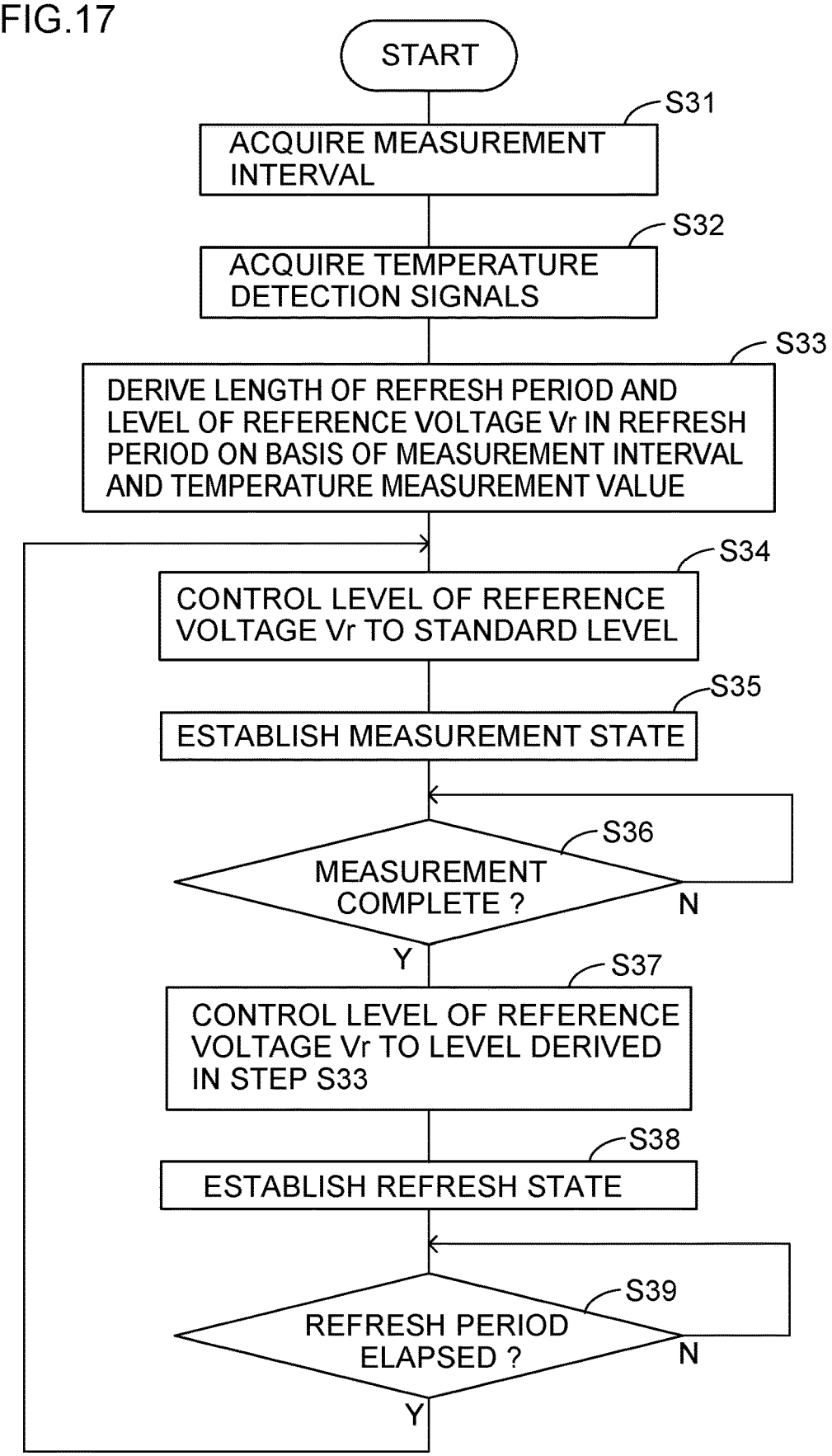
FIG. 17 is a flowchart illustrating a flow of measurement processing relating to the exemplary embodiment of the present disclosure.

FIG. 17 is a flowchart illustrating an example of a flow of measurement processing relating to the fourth exemplary embodiment of the present disclosure, which is executed by the control section 41.

In step S31, the control section 41 acquires the measurement interval at which pH values of the measurement subject 100 are to be measured. The measurement interval corresponds to a period from the measurement state being established until the measurement state is next established.

In step S32, the control section 41 acquires the temperature detection signals Dt outputted from the temperature sensor 60. The temperature detection signals Dt are inputted to the CPU 401 via the I/F section 404 (see FIG. 12).

In step S33, the control section 41 derives the length of the refresh period and the level of the reference voltage Vr in the refresh period on the basis of the measurement interval acquired in step S31 and a temperature of the measurement subject 100 represented by the temperature detection signals Dt acquired in step S32. For example, the control section 41 may refer to a table 409, which is illustrated in FIG. 18, to derive the length of the refresh period and the level of the reference voltage Vr in the refresh period. The table 409 is a database in which combinations of the length of the refresh period and the level of the reference voltage Vr in the refresh period are recorded in association with combinations of the measurement interval and the temperature of the measurement subject 100. The table 409 is configured such that the higher the temperature of the measurement subject 100 and the longer the length of the refresh period, the higher the level of the reference voltage Vr. The table 409 is further configured such that the longer the measurement interval, the longer the length of the refresh period. The table 409 is stored in the auxiliary memory device 403 of the microcomputer constituting the control section 41 (see FIG. 12).

In step S34, the control section 41 provides the control signals Sc to the power source 43, controlling the level of the reference voltage Vr to a pre-specified reference level for measurement.

In step S35, the control section 41 puts the switch 50A into the OFF state, switches the switch 50B to the side connecting with the power source 44 and turns ON the current source 45, establishing the measurement state (see FIG. 4A). Hence, an output voltage Vo representing the pH value of the measurement subject 100 is converted to a digital value by the analog-digital converter 42 and outputted through the output terminal 46.

In step S36, the control section 41 makes a determination as to whether the measurement of the pH value of the measurement subject 100 is complete. In a case in which the control section 41 determines that the measurement of the pH value of the measurement subject 100 is complete, the control section 41 proceeds to step S37.

In step S37, the control section 41 provides the control signals Sc to the power source 43, controlling the level of the reference voltage Vr to the level derived in step S33.

In step S38, the control section 41 puts the switch 50A into the on state, switches the switch 50B to the side connecting with ground and turns OFF the current source 45, establishing the refresh state (see FIG. 4B). Hence, the source and drain of the ISFET 30 are connected to ground potential, and the reference voltage Vr at the level derived in step S33 is applied to the reference electrode 20. In the refresh state, the potential difference between the ISFET 30 and the reference electrode 20 is greater than the potential difference between the ISFET 30 and the reference electrode 20 in the measurement state. As a result, the surface potential of the ion-sensitive film 31 is refreshed to the initial state. Thus, variations of the output voltage Vo due to drift are suppressed. The potential difference between the ISFET 30 and the reference electrode 20 is greater in correspondence with the level of the reference voltage Vr.

In step S39, the control section 41 makes a determination as to whether the refresh period with the length derived in step S33 has elapsed since establish of the refresh state. In a case in which the control section 41 determines that the refresh period has elapsed, the control section 41 returns the processing to step S34.

Figure 19:
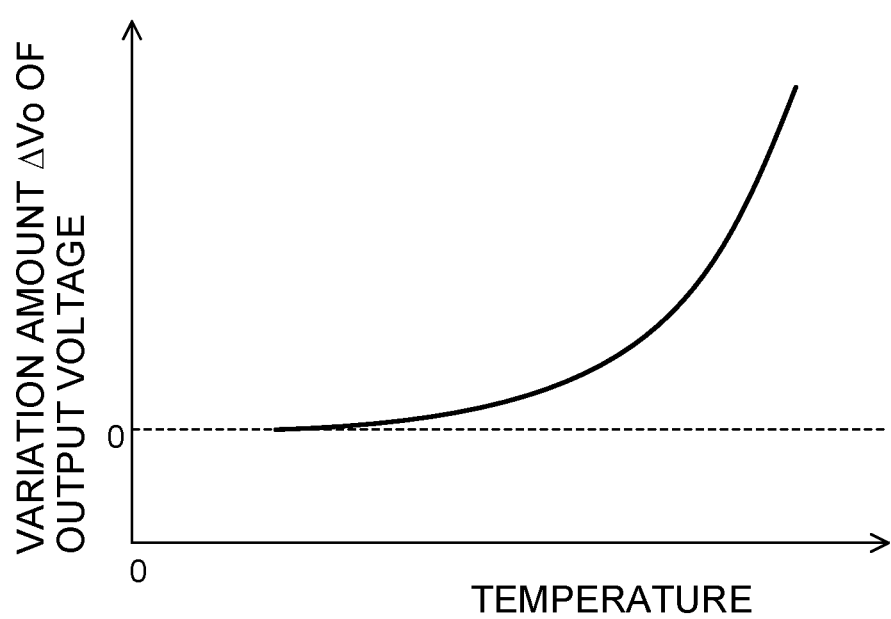
FIG. 19 is a graph illustrating a relationship between temperature of a measurement subject and variation amount per unit time of output voltage due to drift.

FIG. 19 is a graph illustrating an example of a relationship between the temperature of the measurement subject 100 and the variation amount ΔVo per unit time of the output voltage Vo due to drift. As illustrated in FIG. 19, the variation amount ΔVo per unit time of the output voltage Vo due to drift increases exponentially with rising temperature of the measurement subject 100. Therefore, in a case in which the length of the refresh period and the level of the reference voltage Vr are set without consideration for the temperature of the measurement subject 100, it may not thoroughly suppress variations in the output voltage Vo caused by drift. According to the measurement device 1B of the present exemplary embodiment, control is performed such that the higher the temperature of the measurement subject 100, the longer the length of the refresh period and the higher the level of the reference voltage Vr. Thus, variations in the output voltage Vo caused by drift may be suppressed effectively.

In the present exemplary embodiment, a case in which the table 409 is used to derive the level of the reference voltage Vr in the refresh period, have been described. However, the present disclosure is not limited thereto. For example, the level of the reference voltage Vr in the refresh period may be derived by using a function representing a relationship between the length of the refresh period, the temperature and the level of the reference voltage Vr. Further, control may be performed such that, if the refresh period derived on the basis of the measurement interval and temperature falls below a pre-specified minimum period, the level of the reference voltage Vr for that refresh period and temperature is raised relative to a standard level. In the present exemplary embodiment, a case in which the level of the reference voltage Vr is controlled on the basis of the refresh period that is derived on the basis of the measurement interval and temperature, has been described. However, the refresh period may be fixed and the level of the reference voltage Vr controlled on the basis of the measurement interval and temperature. In this case, control such that the shorter the measurement interval and the higher the temperature, the higher the level of the reference voltage Vr is preferable.

Herein, the measurement state is an example of a first state of the present disclosure, and the refresh state is an example of a second state of the present disclosure. The period corresponding to the measurement interval is an example of a first period of the present disclosure, and the refresh period is an example of a second period of the present disclosure.

What is claimed is:

1. A measurement device comprising:
   an ion-sensitive element;
   a reference electrode disposed in a state in which a measurement subject is interposed between the reference electrode and the ion-sensitive element; and
   a controller configured to
   establish a first state at a predetermined interval, the first state being a state in which a current flows at the ion-sensitive element,
   establish a standby state within the predetermined interval, the standby state being a state in which the ion-sensitive element and the reference electrode are both set into a floating state, and
   establish a second state within the predetermined interval, the second state being a state in which a potential difference between the ion-sensitive element and the reference electrode is greater than a potential difference between the ion-sensitive element and the reference electrode in the first state.

2. The measurement device according to claim 1, wherein the controller establishes the second state for a predetermined period before establishing the first state.

3. The measurement device according to claim 1, wherein the controller controls a length of a second period based on a length of a first period, the first period being a measurement interval corresponding to a period from establishment of the first state until the first state is next established, and the second period being a period in which the controller maintains the second state.

4. The measurement device according to claim 3, wherein the controller controls a level of a voltage applied to the reference electrode in the second period based on the length of the first period or the length of the second period.

5. The measurement device according to claim 3, further comprising a temperature sensor, wherein the controller is configured to control the length of the second period and a level of a voltage applied to the reference electrode in the second period based on the length of the first period and a temperature detected by the temperature sensor.

6. The measurement device according to claim 1, wherein the ion-sensitive element is an ion-sensitive field-effect transistor.

7. A measurement method for using a measurement device to measure a characteristic of a measurement subject, the measurement device including an ion-sensitive element and a reference electrode disposed in a state in which the measurement subject is interposed between the reference electrode and the ion-sensitive element, and the measurement method comprising:
   establishing a first state at a predetermined interval, the first state being a state in which a current flows at the ion-sensitive element,
   establishing a standby state within the predetermined interval, the standby state being a state in which the ion-sensitive element and the reference electrode are both set into a floating state, and
   establishing a second state within the predetermined interval, the second state being a state in which a potential difference between the ion-sensitive element and the reference electrode is greater than a potential difference between the ion-sensitive element and the reference electrode in the first state.

* * * * *